June 22, 1965 N. P. OGLESBY ETAL Re. 25,806
TRENCH DIGGING MACHINES
Original Filed May 22, 1956 3 Sheets-Sheet 1
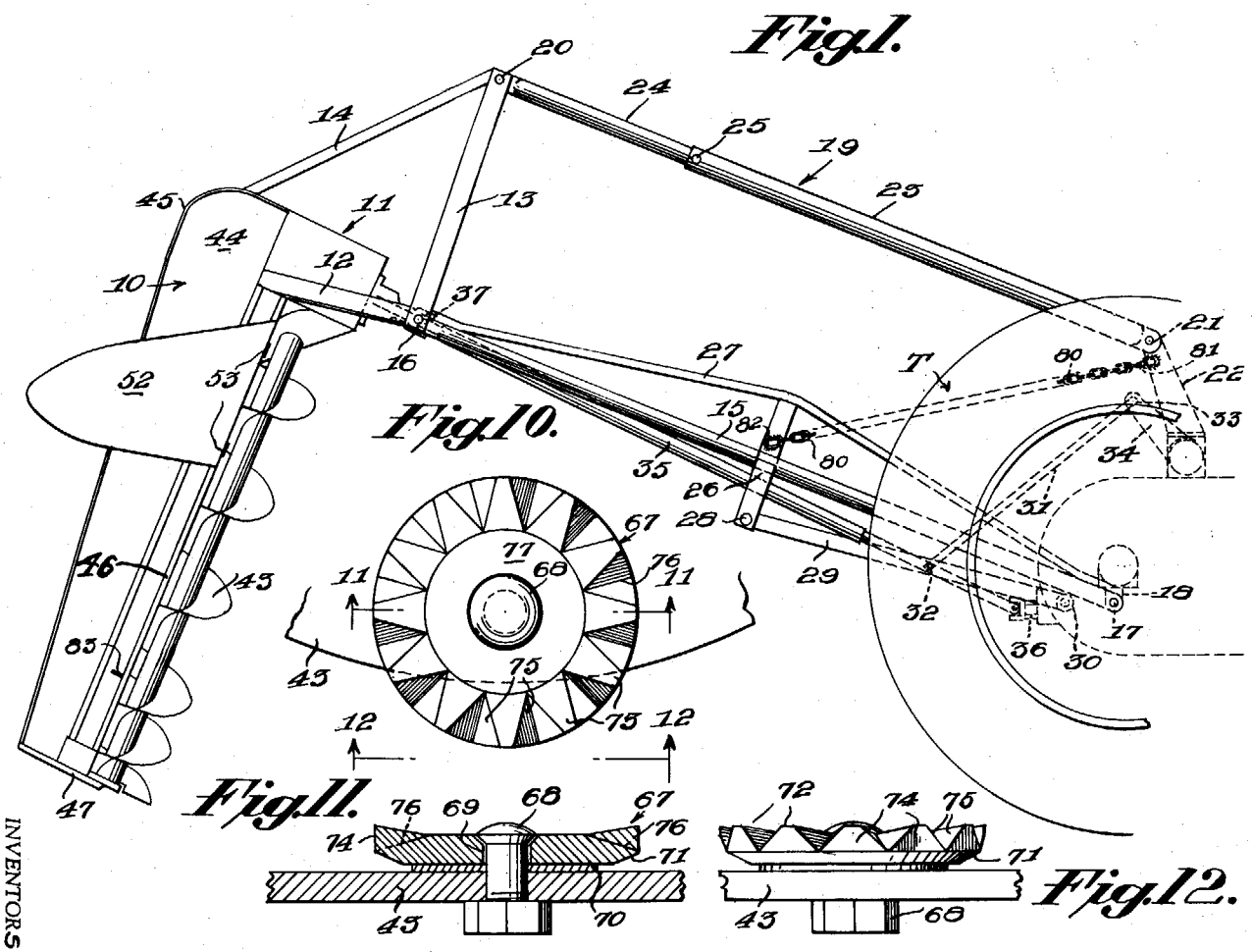
INVENTORS
N. P. Oglesby
H. L. Turpin, Jr.
Robert E. Fowlkes
BY Stone, Boyden & Brady
ATTORNEYS June 22, 1965 N. P. OGLESBY ETAL Re. 25,806
TRENCH DIGGING MACHINES
Original Filed May 22, 1956 3 Sheets-Sheet 2
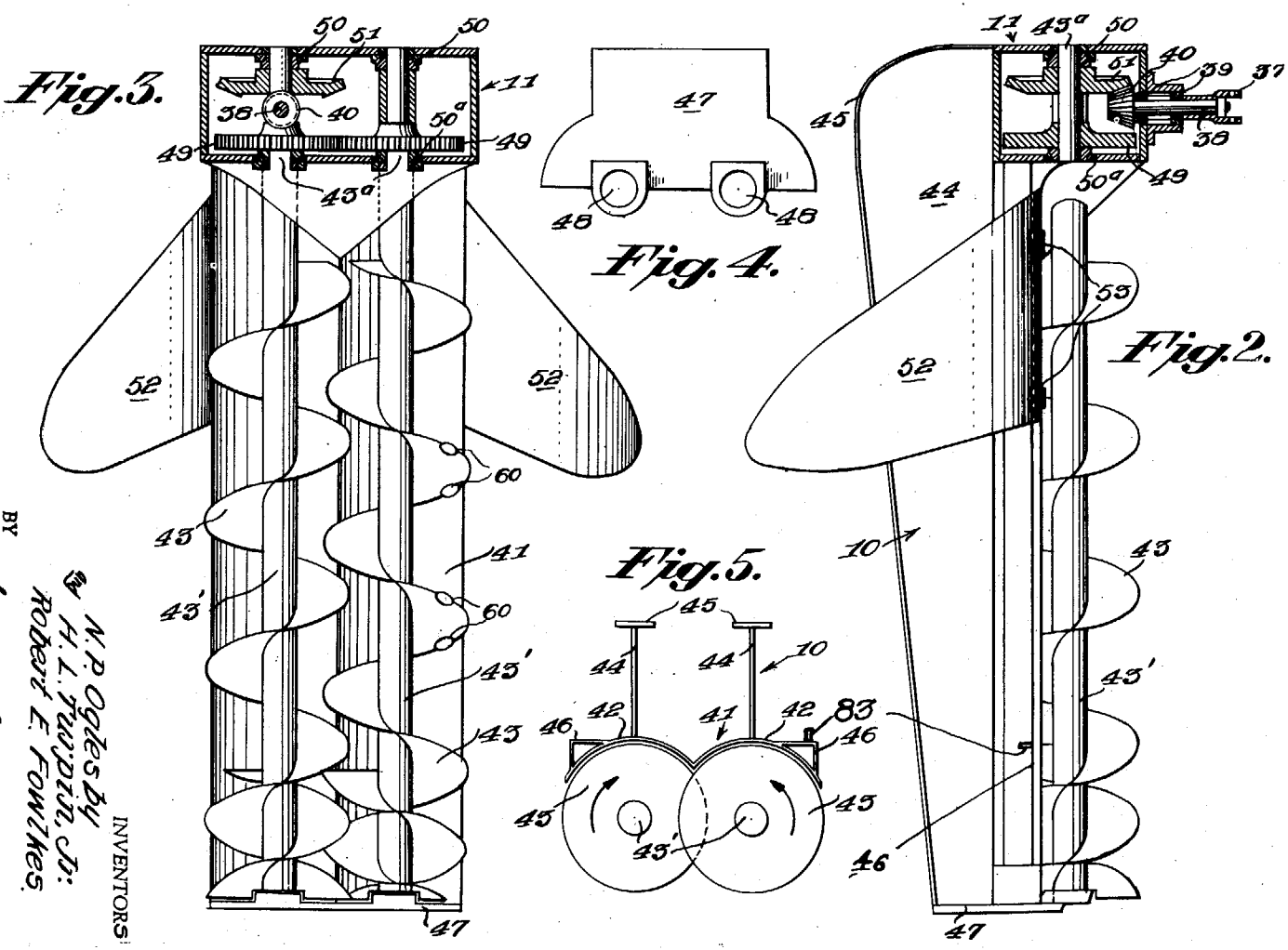
INVENTORS
N. P. Oglesby
H. L. Twipin, Jr.
Robert E. Fowlkes
BY
Stone, Boydent & Inach
ATTORNEYS

TRENCH DIGGING MACHINES

Original Filed May 22, 1956 3 Sheets-Sheet 3

INVENTORS
N. P. Oglesby
and H. L. Turpin Jr.
Robert E. Fowlkes.

BY Stone, Boyden & Mack
ATTORNEYS.

United States Patent Office

Re. 25,806
Reissued June 22, 1965

25,806

TRENCH DIGGING MACHINES

Nicholas P. Oglesby, 906 Chalfonte Drive, Alexandria, Va., and Henderson Lee Turpin, Jr., and Robert E. Fowlkes, both % Wythe County Motors, Inc., Wytheville, Va.

Original No. 3,039,208, dated June 19, 1962, Ser. No. 586,581, May 22, 1956. Application for reissue June 19, 1964, Ser. No. 388,028
11 Claims. (Cl. 37—81)

Matter enclosed in heavy brackets [ ] appears in the original patent but forms no part of this reissue specification; matter printed in italics indicates the additions made by reissue.

This invention relates to a trench digging machine.

The invention is more particularly concerned with a trench digging machine embodying a digging head adapted to be drawn through the ground by means of a tractor and a primary feature of the invention is the provision of relatively simple means operatively connecting the said head with the tractor and having provision for moving the head in a longitudinal vertical plane and also laterally to positions at angles to said plane.

A further feature of the invention is the provision of a trench digging machine which is readily mountable on a standard commercially available rubber-tired tractor.

A still further feature of the invention is the provision of a trench digging machine including a tractor controlled digging head including a frame and a pair of laterally disposed digger augers rotatably supported thereby, together with provision for lateral discharge of the dug material to either side of the trench under conditions of variable depth trenches.

A still further feature of the invention is sturdy bearing means in the frame for rotatably supporting the upper and lower ends of the digging augers, and wherein the lower bearing means functions to clean the bottom of the trench.

A still further feature of the invention is the provision of simple and dependable tractor operated drive means for imparting opposite direction rotation to the augers.

A still further feature of the invention is the provision of improved cutting members disposed adjacent the edges of the auger flights and which embody cutting wheels rotatably supported on the flights and which in operation move bodily with the flights and simultaneously therewith rotate about their axes.

Other features and advantages of the invention will become apparent in the course of the following detailed description, taken in connection with the accompanying drawings, wherein:

FIGURE 1 is a side elevational view of the improved trenching machine in accordance with a preferred structural embodiment thereof and wherein same is shown in operative connection with the rear end of a tractor.

FIGURE 2 is a side elevational view of the digging head per se with the transmission gear box being shown in longitudinal vertical section.

FIGURE 3 is a front elevational view of the digging head per se with the transmission gear box being shown in transverse vertical section.

FIGURE 4 is a top plan view of the bottom support bearing plate and trench cleaner.

FIGURE 5 is a top plan view of the auger supporting frame with the augers supported therein.

FIGURE 10 is a fragmental plan view of an auger flight together with a second form of earth cutting wheel rotatably supported thereon.

FIGURE 11 is a transverse sectional view as observed in the plane of line 11—11 on FIG. 10.

FIGURE 12 is a fragmental edge view of the auger flight with the earth cutting wheel shown in elevation, the view being observed in the plane of line 12—12.

Figure 8:
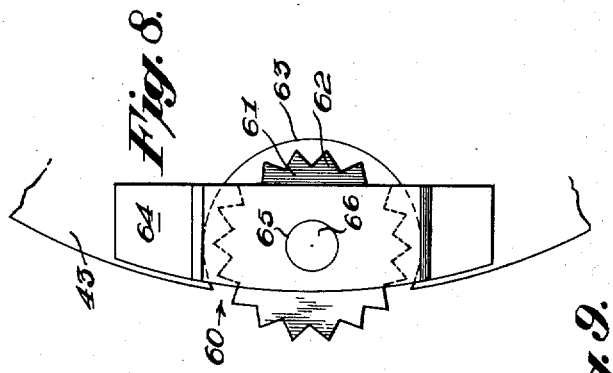
FIGURE 8 is a top plan view of the structure shown in FIGURE 7.

Referring now in detail to the drawings, the trench digging head will be seen to comprise a frame 10 having a unitary gear transmission box 11 at the upper end thereof. The invention comprises novel means for connecting the frame 10 to a standard tractor T whereby the frame is not only subjected to power draft but is also capable of progressive downward movement in the digging of a trench and to be power elevated to an inoperative position.

Such means in a preferred structural embodiment thereof comprises a frame rigid with the upper end of the digging head frame 10 and which preferably includes a bar 12 rigidly secured to each side of the gear box 11 and to the inwardly projecting ends of which are secured the lower ends of a pair of upwardly converging bars 13. The upper ends of the bars 13 are rigidly connected to the frame 10 by means of a bar 14.

The frame 12 to 14 has a parallelogram pivotal connection with the tractor T and for which purpose the rear ends of a pair of rods 15 are pivotally connected to the bars 12, 13 at the junctions thereof as indicated at 16 and the forward ends of such rods are pivotally connected as at 17 to brackets 18.

A rod 19 is pivotally connected at its rear end at 20 to the upper ends of bars 13 and the forward end of such rod is pivotally connected as at 21 to a bracket 22. The brackets 18 and 22 fit standard tractor mounting facilities.

The rod 19 includes a tubular section 23 and a telescoping section 24 whereby the rod 19 is lengthwise adjustable for varying the angle of the digging augers as will later appear and means 25 is provided for locking the rod sections 23, 24 in any desired adjusted positions.

The rods 15 are each engaged intermediate their ends by a bracket 26 over which extends a reinforcing member 27. The brackets 26 project below the rods 15 and are pivotally connected as at 28 to the rear ends of lever arms 29 whose forward ends are pivotally connected to the tractor T as indicated at 30. Lever arms 31 have corresponding ends thereof pivotally connected to the lever arms 29 as at 32 and have their opposite ends pivotally connected as at 33 to standard tractor elevating means 34.

A drive shaft 35 has a universal connection 36 at the inner end thereof with the power take-off of the tractor and which at the outer end thereof has a universal connection as at 37 with a stub shaft 38 rotatably mounted in bearings 39 on the gear box 11. The inner end of the stub shaft 38 is provided with a pinion 40 for a purpose later referred to.

Figure 6:
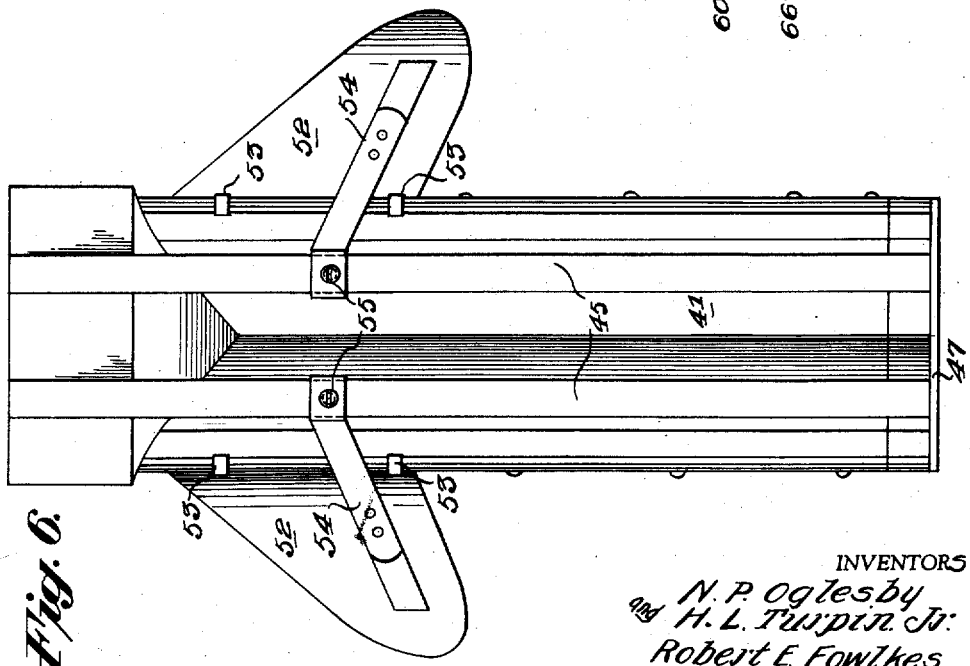
FIGURE 6 is a rear elevational view of the digging head per se.

The above referred to digging head frame 10 comprises a dirt shield 41 which as indicated more particularly in FIG. 5 comprises a pair of unitary sections 42 which are of concavo-convex form and whose curvatures are in arcs having centers in the axes of a pair of augers 43. The pitch of the augers is such as to move dry earth, that is earth in natural condition. It will be obvious that the present invention does not involve the use of the center bore of any shaft. The frame 10 further includes a vertical web 44 projecting from the convex face of each shield section 42 with the two webs parallel and normal to a tangent of the said sections at the bases of the said webs and the said webs at their outer edges are provided with symmetrical flanges 45. Further the said shield sections 42 are each provided with a dirt shield support 46 adjacent the outer edge thereof. As is indicated in FIGS. 2, 3 and 6 the gear housing 11 is disposed at the upper end of casing 10 and to which the upper end portions of webs 44 and flanges 45 are rigidly secured. A bottom support bearing plate and trench cleaner 47 is disposed at the lower end of frame 10 and as indicated in FIG. 4 same includes a pair of sockets 48 for the reception of bearings for the lower ends of the auger shafts 43'. The augers 43 are disposed in concentric relation to the shield sections 42 as indicated in FIG. 5 and with the shafts 43' thereof rotatably journalled at their lower ends in plate 47. The upper ends of the shafts are reduced as indicated at 43a and extended vertically through the gear box 11 as indicated in FIGS. 2 and 3.

The augers 43 are rotated in opposite directions and for this purpose a spur gear 49 is secured to each reduced shaft portions 43a within the gear box 11 and the gears are in constant mesh as indicated in FIG. 3. The upper ends of the shaft portions 43a are journalled in taper roller bearings 50 and the said shaft portions are also journalled in taper roller bearings 50a in the base of the gear box. One of the shaft portions 43a is provided with a ring gear 51 with which said driving pinion 40 is in constant mesh whereby upon rotation of drive shaft 35 the two augers 43 will be rotated in opposite directions.

The frame 10 is provided with a pair of angle-wing moldboards 52 for laterally deflecting the dug material from the top of a trench being dug and the moldboards are preferably vertically adjustable for variation of the depth of a trench being dug. Suitable means for such purpose may be the provision of brackets 53 on the inner edges of the moldboards and which are slidable along the edges of the shield 41 and adjusting arms 54 supported by the moldboards as indicated in FIG. 6 and having an adjustable sliding engagement 55 with the frame flanges 45.

Figure 7:
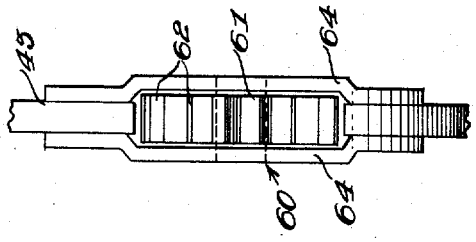
FIGURE 7 is a fragmental edge view of an auger flight together with one form of earth cutting wheel rotatably supported thereon.
Figure 9:
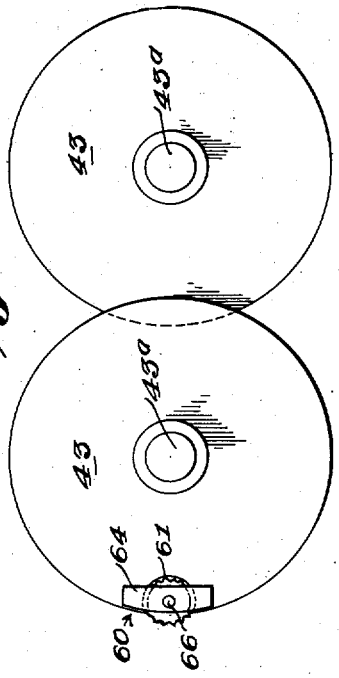
FIGURE 9 is a top plan view of the pair of augers involved in the construction showing one of the earth cutting wheels of FIGS. 7 and 8 mounted on the flight of one thereof.

The flights of the two augers 43 have a substantial overlap as indicated in FIG. 5 and in order to provide for a maximum soil cutting efficiency of the augers the flights thereof are provided with spaced soil cutting members indicated generally at 60 in FIG. 3 and which in practice extend throughout the digging edge of each flight in regular relatively closely spaced relation. A satisfactory form of cutting member is illustrated in FIGS. 7, 8 and 9 and which embodies a peripherally toothed wheel 61 whose teeth 62 are of triangular form with resulting sharp cutting ends. The wheel 61 is disposed within a recess 63 in the edge of the auger flight 43 and the wall of the recess is preferably concentric with the axis of the wheel as is clearly indicated in FIG. 8. The cutting wheel 61 is rotatably suported within said recess with a substantial segment of the wheel projecting beyond the edge of the flight by means of a pair of brackets 64 suitably rigidly secured to opposite sides of the flight and having axially aligned apertures 65 therein in which opposite ends of a stub shaft 66 rigid with the wheel are rotatably supported.

A modified form of cutting member is illustrated in FIGS. 10, 11 and 12 wherein the cutting wheel 67 is mounted on one face of the auger flight rather than in the plane of the edge thereof as in FIGS. 7, 8 and 9. The cutting wheel 67 is mounted on one side of the auger flight 43 by means of a pivot bolt 68 extending through an aperture 69 centrally of the wheel and also through the flight 43 and a wear plate 70 is disposed between the wheel 67 and the flight 43. The wheel 67 is provided with an outwardly bevelled inner portion 71 and a plurality of cutting teeth 72 which are formed both on the periphery of the wheel and a side thereof opposite the bevelled portion 71. The teeth 72 have outer faces 73 which are in planes substantially parallel to the bevelled portion 71, outer peripheral faces 74 which are normal to the flight 43, and opposite side faces 75 which diverge from said outer faces 73 to valley lines 76 which extend downwardly and outwardly from the plane of the top central portion 77 to the junction of bevelled portion 71 and the peripheral faces 74.

It will be observed that the cutting wheels 67 of FIGS. 10, 11 and 12 are adapted for a cutting action predominantly on the upper side of the cutter and for lateral movement of the auger. The trench digging machine of this invention is especially capable of serving to cut a trench and thus with lateral movement of the auger is contrasted to the digging of holes or wells which require primarily a vertical movement of the cutting elements. It will also be observed that the cutting members of this machine are mounted on a spiral surface on the flight of an auger and that each cutting wheel is mounted with an acute angle to the horizontal axis.

As is indicated by the arrows on FIG. 5, the right hand auger 43 rotates counter-clockwise while the left hand auger 43 rotates clockwise. Furthermore, as is indicated in FIG. 3, the right hand auger 43 has a left hand spiral flight while the left hand auger 43 has a right hand spiral flight.

While as previously stated, the auger flights have a substantial overlap, such overlap according to the invention is approximately one fifth of the diameter of the augers whereby a relatively large opening is provided between the augers for the discharge of rocks and debris through the auger flights.

It is to be particularly noted that the rods 15 and 19 are substantially parallel whereby the frame 12 to 14 has a parallelogram pivotal connection with the tractor T which provides for raising and lowering of the augers without changing the angles thereof.

Having set forth the construction of the improved trench digging machine, the operation thereof is as follows:

The hydraulically controlled lever arms 34 on the tractor are released with a resulting downward gravitation of the digging head including the frame 10 and augers 43 to a ground engaging position and therewith the drive shaft 35 is set into rotation by the power take-off of the tractor. With the said head in ground engaging position it is under its own weight and in order to provide for a more effective digging operation the head is initially disposed at an angle to the vertical as indicated in FIG. 1 and the angle may be readily varied through adjustment of the telescoping frame sections 23 and 24. The pair of laterally disposed augers 43 rotate in opposite directions whereby lateral lead-off is avoided and upon rotation of the augers 43 the cutting wheels 61 or 67 will, through their bodily movements and individual rotation about their axes effect a rapid cutting operation and the loosened material will be conveyed upwardly by the spiral flights of the augers and such material will be confined to the advancing sides of the augers by means of the shield 41. The upwardly conveyed material will be laterally deflected by the curved moldboards 52 which ride along the top of the trench after the portions of the augers below the moldboards have penetrated the ground. The position of the moldboards up or down may be readily varied through adjustment of the means 53, 54, 55. Since the flights of the two augers overlap or intermesh the augers will be self cleaning and as the augers advance in the trench digging operation, the lower bearing plate 47 will clean the bottom of the trench.

In the event it is desired to dig a vertical trench in ground having an inclined surface on which the tractor T must travel, the digging head supporting frame 12, 13 and 14 may be adjusted about the axis of rod 19 by proper adjustment of the support rods 31 whereby one rod will be moved a different vertical distance than the other rod 15 with a resulting disposition of the cutting head in a vertical plane. This freedom of adjustment is possible by reason of the customary loose connections between such parts as 15, 13, 24, 20, 16, 21 and 28, and the tractor actuating lever 34.

Extra support for the brackets 26 and their associated connections is provided by a chain 80, one end of which is detachably connected to a hook 81 mounted on the bracket 22 and the opposite end of which chain is detachably connected to a link 82 welded to the bracket 26. When the machine is not in use and the digging machine is removed from the tractor the chain 80 is disconnected from the link 81 and that end of the chain is connected to the digging equipment by hooking the chain to a stud 83 mounted on the dirt shield support 46.

We claim:

1. A trench digging machine, comprising a generally vertically disposed frame, a gear box rigidly supported by the upper end of said frame and having a pair of intermeshed spur gears disposed in the bottom thereof, a pair of digging augers depending from said gear box and having their respective shafts extending through the gear box and being secured to the respective spur gears, a shield depending from the gear box and including unitary concavo-convex sections in coaxial relation to said auger shafts, a bearing plate at the lower end of said shield in which the lower ends of said auger shafts are rotatably mounted, a pair of spaced parallel webs projecting from the convex sides of said shield sections each of which is provided with a terminal flange projecting from each side thereof, and said webs, and said flanges extending rearwardly of said gear box and to the top thereof.

2. The structure according to claim 1, together with a ring gear secured to one of said auger shafts within said gear box, a stub shaft rotatably supported on said gear box and having a bevelled pinion in constant mesh with said ring gear, and a drive shaft having one end thereof universally connected to said stub shaft, the opposite end of the drive shaft adapted for connection with a tractor.

3. A trench digging machine comprising a generally vertically disposed frame comprising a dirt shield including a pair of unitary sections of concavo-convex form, a gear box rigidly supported by the frame at the upper ends of said sections, a vertical web projecting from the convex face of each of said sections, the said webs being parallel and normal to a tangent of said sections at the bases of the webs, said webs being provided wih flanges at their outer edges, said flanges each being provided with a mold board support, a pair of augers disposed within said sections in concentric relation to the concave sides thereof, one of said augers having a left hand spiral flight and the other auger having a right hand spiral flight, and drive means for said augers including gears in said gear box for imparting counter-clockwise rotation to said one of said augers and clockwise rotation to said other auger.

4. A trench digging machine, comprising a gear box having a pair of intermeshed spur gears disposed in the bottom thereof, a pair of digging augers depending from said gear box and having their respective shafts extending through the gear box and being secured to the respective spur gears, a shield depending from the gear box and including unitary concavo-convex sections in coaxial relation to said auger shafts, a bearing plate at the lower end of said shield in which the lower ends of said auger shafts are rotatably mounted, a pair of spaced parallel webs projecting from the convex sides of said shield sections each of of which is provided with a terminal flange projecting from each side thereof, said webs, and said flanges extending rearwardly of said gear box and to the top thereof, and a pair of dug material deflecting mold boards adjustably supported on said flanges.

5. A trench digging machine comprising an elongated frame having upper and lower ends, an auger having a central shaft portion and a single spiral flight adapted to move earth in dry condition and opposite ends thereof rotatably journalled in said upper and lower ends of the frame, a plurality of cutting members rotatably supported on the upper spiral surface of the flight of the auger immediately adjacent the cutting edge thereof and distant from the axis edge of the flight of said auger whereby the major area of the surface of the flight is unobstructed and passage of soil upwardly is not blocked, said members each comprising a toothed wheel mounted with an acute angle to the horizontal axis and for rotation on a pivot pin carried by the flight of said auger and extending through said flight and a wear plate disposed between said wheel and said flight and through which said pivot pin extends, said cutting members being adapted for a cutting action predominantly on the upper side of the cutter and for lateral movement of the auger.

6. A trench digging machine comprising an elongated frame having upper and lower ends, an auger having a central shaft portion and a single spiral flight adapted to move earth in dry condition and opposite ends thereof rotatably journalled in said upper and lower ends of the frame, a plurality of cutting members rotatably supported on the upper spiral surface of the flight of the auger immediately adjacent the cutting edge thereof and distant from the axis edge of the flight of said auger whereby the major area of the surface of the flight is unobstructed and passage of soil upwardly is not blocked, said members each comprising a toothed wheel disposed in parallel relation to the flight and with an acute angle to the horizontal, a pivot pin for each cutting member mounted on the flight of said auger and adjacent to the cutting edge thereof and extending through said flight, means to secure said pivot pins to said flight, each of said cutting members being mounted for rotation on its respective pivot pin and a wear plate disposed between said wheel and said flight and through which said pivot pin extends.

7. A trench digging machine comprising a generally vertically disposed digging head including a frame and a pair of cooperating augers rotatably supported thereby for rotation about spaced parallel axes, a second frame rigidly supported by said first frame and including a pair of upwardly converging bars, a pair of laterally opposed rods having their rear ends pivotally connected to said second frame adjacent the lower ends of said bars and the forward ends of said rods being adapted for connection with a tractor, a further rod generally parallel with said pair of rods having its rear end pivotally connected to the upper ends of said bars, the opposite end of said last rod being adapted for pivotal connection with said tractor, a bracket secured to each of said pair of rods intermediate the ends thereof, each of said brackets having a pivotal connection with one end of a lever arm whose opposite end is adapted for pivotal connection with a tractor, a second lever arm having one end thereof pivotally connected to each of said first lever arms intermediate the ends thereof, and the opposite ends of said second lever arms adapted for pivotal connection with elevating means on said tractor, whereby upon differential movement of said elevating means, one of said pair of rods will be moved vertically a greater distance than the other rod with a resulting transverse adjustment of the digging head about the axis of said further rod.

8. The structure according to claim 7 together with a gear box rigidly supported by the upper end of said first frame, said second frame including a bar rigidly supported by said gear box at each side thereof, and to whose corresponding ends the lower ends of said upwardly converging bars are secured.

*9. A trench digging machine comprising an elongated frame having upper and lower ends, an auger having a central shaft portion and a spiral flight adapted to move earth in dry condition and opposite ends thereof rotatably journalled in said upper and lower ends of the frame, a plurality of cutting members rotatably supported on the upper spiral surface of the flight of the auger immediately adjacent the cutting edge thereof and distant from the axis edge of the flight of said auger whereby the major area of the surface of the flight is unobstructed and passage of soil upwardly is not blocked, said members*

*each comprising a toothed wheel mounted with an acute angle to the horizontal axis and for rotation with respect to the flight of said auger, said cutting members being adapted for a cutting action predominantly on the upper side of the cutter and for lateral movement of the auger.*

*10. A trench digging machine comprising an elongated frame having upper and lower ends, an auger having a central shaft portion and a spiral flight adapted to move earth in dry condition and opposite ends thereof rotatably journalled in said upper and lower ends of the frame, a plurality of cutting members rotatably supported on the upper spiral surface of the flight of the auger immediately adjacent the cutting edge thereof and distant from the axis edge of the flight of said auger whereby the major area of the surface of the flight is unobstructed and passage of soil upwardly is not blocked, said members each comprising a toothed wheel disposed in parallel relation to the flight and with an acute angle to the horizontal, means carried by said flight for the rotatable mounting of said cutting members.*

*11. In a trench digging machine adapted to move earth in a dry condition, including an auger having an axial shaft portion and a substantially helical flight carried thereby, and means for rotating the auger about the axis of such shaft and for simultaneously moving the auger laterally, the improvement which comprises a plurality of cutting members rotatably supported upon the upper helical surface of the flight of the auger immediately adjacent the cutting edge thereof and distant from the shaft portion, whereby the major area of the surface of the flight is unobstructed and passage of soil upwardly is not blocked, each of said cutting members comprising a toothed wheel mounted for independent rotation about an individual axis substantially perpendicular to the adjacent surface of the flight, the helix angle of the flight being low enough so that the flight surfaces lie at an acute angle to the horizontal when the shaft axis is vertical, said cutting members being adapted for cutting action predominantly on their upper sides and being rotatable about their individual axes when engaged with earth during lateral movement of the auger.*

References Cited by the Examiner

The following references, cited by the Examiner, are of record in the patented file of this patent or the original patent.

UNITED STATES PATENTS

| | | |
|---|---|---|
| 2,096,875 | 10/37 | Bertovich. |
| 2,184,108 | 12/39 | Akeyson. |
| 2,360,334 | 10/44 | Engel et al. |
| 2,490,698 | 12/49 | McClenny. |
| 2,545,016 | 3/51 | Berry. |
| 2,598,350 | 5/52 | Carroll. |
| 2,657,916 | 11/53 | Von Stroh. |
| 2,772,491 | 12/56 | Stansbury. |

FOREIGN PATENTS

| | | |
|---|---|---|
| 17,094 | 10/91 | Great Britain. |
| 491,649 | 3/53 | Canada. |

CHARLES E. O'CONNELL, *Primary Examiner.*

BENJAMIN HERSH, *Examiner.*